United States Patent [19]

Beaujean et al.

[11] 3,850,593

[45] Nov. 26, 1974

[54] APPARATUS AND PROCESS FOR THE SEPARATION OF INERT GASES FROM GAS MIXTURE CONTAINING CARBON DIOXIDE

[75] Inventors: Holger Beaujean; Manfred Laser, both of Julich, Germany

[73] Assignee: Kernforschungsanlage Julich G.m.b.H., Julich, Germany

[22] Filed: June 23, 1972

[21] Appl. No.: 265,726

[30] Foreign Application Priority Data

June 25, 1971 Germany............................ 2131507

[52] U.S. Cl............................ 55/66, 62/17, 176/37
[51] Int. Cl........................... B01d 53/14, F25j 3/02
[58] Field of Search.......... 55/66, 68; 62/17, 20, 22, 62/23, 24, 27, 28; 176/37

[56] References Cited

UNITED STATES PATENTS

| | | | |
|---|---|---|---|
| 2,502,282 | 3/1950 | Schliff.................................... | 62/22 |
| 2,551,399 | 5/1951 | Silvenberg............................ | 62/20 |
| 2,962,868 | 12/1960 | Dennis................................... | 62/20 |

*Primary Examiner*—Charles N. Hart
*Attorney, Agent, or Firm*—Karl F. Ross; Herbert Dubno

[57] ABSTRACT

A system for the separation of inert gases, which may be radioactive, from carbon dioxide gas mixtures wherein the gas mixture is washed with liquid carbon dioxide in which the inert gases, expecially krypton and xenon are highly soluble, whereupon the radioactive inert gases are separated from the liquid carbon dioxide in a rectification column.

10 Claims, 2 Drawing Figures

APPARATUS AND PROCESS FOR THE SEPARATION OF INERT GASES FROM GAS MIXTURE CONTAINING CARBON DIOXIDE

FIELD OF THE INVENTION

Our present invention relates to a method of and an apparatus for the removal or separation of heavy inert gases especially krypton and xenon from gas mixtures containing carbon dioxide. More particularly, the invention relates to the elimination of radioactive inert gases from gas mixtures containing carbon dioxide as can be produced by combustion of carbon-coated or carbon-encased nuclear-reactor materials, such as nuclear fuel and breeder (fertile) materials.

BACKGROUND OF THE INVENTION

In the treatment of carbon-containing nuclear materials, e.g. pyrolitic-carbon-coated nuclear-fuel or fertile particles, graphite-sheathed nuclear materials and bodies of carbon or graphite in which such nuclear materials are embedded, it is known to burn the carbon or graphite, thereby producing a gas mixture containing carbon dioxide, nitrogen (from the atmosphere air used in the combustion process) and heavy inert gases such as krypton and xenon which are formed by fission reactions in the nuclear reactors. Such processes may be used to recover valuable materials such as nuclear fuel from the fuel elements of the reactors. Since the heavy inert gases, especially krypton and xenon, are partly radioactive it is important to remove them from the gas mixture before the latter is released into the atmosphere.

Several methods have been proporsed for the recovery of such inert gases as krypton and xenon from gas mixtures containing carbon dioxide; for example, it is known to wash the gas mixture with water or some other solvent in which the carbon dioxide is highly soluble and the xenon and krypton are slightly soluble or insoluble. The product of this washing is a nitrogen inert-gas mixture which may be separated into its components by rectification. The term "rectification" is used herein to refer to a separation of gas components by liquefaction, fractional condensation and washing of the gaseous components with the components obtained by condensation and fractional separation from the liquid phase. The process is carried out in a rectification column, the sump of which constitutes a boiler for the condensate, causing a gas to rise in the column and pass countercurrent to refluxing liquid.

The water-washing procedure described above eliminates the main component of the gas mixture, namely, carbon dioxide by dissolving it in water, the water being thereafter discarded or free from carbon dioxide by heating for reuse of this solvent. The process has the disadvantage that large volumes of extraneous solvents must be used, stored and treated, with complications in circulation, handling and the like. Furthermore, the separation of inert gases from nitrogen by rectification is a difficult and expensive process.

In another system for the removal of inert gases from gas mixtures containing carbon dioxide, the carbon dioxide is absorbed in an aqueous solution of ethanolamine. The system has the disadvantage noted earlier since extraneous solvent must be used. Moreover, any process involving contact between water or an aqueous solution and the gas mixture results in some solubilization of the inert gases and hence some radioactive contamination of the solution. This not only complicates the handling of the solvent but also requires a treatment thereof to eliminate the radioactive materials before the solvent of discarded. The various treatments of the solvent increase the cost of the separation process.

Ironically the separation process whereby the radioactive contaminants are removed from the solvent system yields mixtures of carbon dioxide and the inert gases. In yet another process proposed heretofore for the removal of heavy inert gases from carbon dioxide mixtures containing same, the gas mixture is passed through a solid adsorbent of molecular sieve (zeolite) whereby the carbon dioxide is trapped by the adsorbent and can be removed by subsequent treatment, e.g. heating of the zeolite. Even this process has been found to be unsatisfactory because the molecular sieve or adsorbent also traps some so that, upon regeneration of the adsorbent the gases evolved are carbon dioxide-containing mixtures of the inert gases.

According to another proposal, the inert gas is removed from the carbon dioxide by rectification treatments similar to those used for the rectification of aid into its components. Still further efforts to separate krypton, xenon and like inert gases from gas mixtures containing carbon dioxide use organic solvents which selectively absorb components of the gas mixture. In such solvents, however, the solubility of carbon dioxide is much greater than the solubility of the inert gases and the use of the process for the recovery of inert gases in the presence of carbon dioxide has proved to be fruitless.

Finally, we may mention efforts to employ permselective membranes for the separation of carbon dioxide mixtures containing noble gases. These systems have not found practical realization because of the poor economics of the process.

OBJECTS OF THE INVENTION

It is the principal object of the present invention to provide a method of removing heavy inert gases, especially krypton and xenon, from gas mixtures containing carbon dioxide, especially gas mixtures produced by the combustion of carbon-containing nuclear materials of the type previously described.

Another object of the invention is to provide an improved system for the removal of xenon and krypton from gas mixtures containing these components and possibly being radioactive, in such manner as to enable the remainder of the mixtures to be released into the atmosphere without danger to the environment.

Still another object of the invention is to provide a method of the character described which can be carried out in apparatus of relatively small size, avoiding gas storage chambers in which radioactivity must be permitted to decay which does not require extraneous solvents and which can be carried out efficiently and at low cost.

It is another object of the invention to provide an apparatus for carrying out this improved method.

Still a further object of the invention is to provide a method of removing heavy inert gases from gas mixtures containing them in the presence of carbon dioxide whereby corrosive and difficult-to-handle radiolysis products are avoided.

SUMMARY OF THE INVENTION

These objects and others which will become apparent hereinafter are attained, in accordance with the present invention, by a system whereby the gas mixture is treated (washed) with a liquid carbon dioxide medium in which the inert gases are preferentially soluble and from which the inert gases can be separated in a rectification column.

The invention is based upon our discovery that inert gases, especially krypton and xenon, are relatively highly soluble in liquid carbon dioxide. In fact, the solubility coefficient of krypton i.e., the mole fraction thereof in the solvent (liquid carbon dioxide) is relatively high and can be used to effect a partition of krypton between the gas phase and the liquid phase which so favors the latter as to practically denude the gas mixture of the inert gas. The remaining components of the gas mixture can then be released into the atmosphere. We have found that with a partial pressure of krypton in a gas mixture of carbon dioxide krypton containing 100 parts per million (ppm) of the gas, at room temperature and a pressure of 63 atmospheres, the solubility coefficient is about 0.0072, a value which is three times as great as the value expected from Raoult's law. The solubility coefficient of nitrogen in the liquid carbon dioxide is less than that of krypton and the latter can be recovered free from nitrogen by this solvent washing. In fact, the solubility coefficient of xenon is still higher than that of krypton.

According to a feature of the invention, therefore, the carbon dioxide/inert-gas/nitrogen mixture is compressed until liquefaction begins, i.e., liquified carbon dioxide begins to form in the mixture, and is passed in intimate gas/liquid contactor, including packed and unpacked wash columns and towers, bubble-tray columns, spray towers, gas atomizers, adsorber columns and the like. The resulting liquid carbon dioxide which contains substantially all of the inert gas, especially krypton and xenon, present in the original gas mixture is then recovered and separated into its components in a conventional rectification column. In this column, an inert-gas fraction is recovered as a gas phase at the upperend. It has been found to be especially advantageous to pass the carbon dioxide-containing gas mixture and the liquid carbon dioxide in counterflow through a multistage washing column. In this case, the inert gas concentration in the gas mixture emerging from the washing apparatus can be maintained at any desired level.

With increasing temperature, the pressure at which the process is carried out must be correspondingly increased. However, an increase in pressure corresponds to an increase of the solubility of the inert gas in the liquid carbon dioxide. For reasons of safety, it is desired that the treatments be carried out with a minimum pressure so that explosion and release of radioactive material into the atmosphere will be minimized. It has been found to be desirable to carry out the treatment at a temperature between −50°C (about 223°K) and room temperature (30°C or approximately 303°K) in which the saturation vapor pressure of carbondioxide is between 10 and 65 atmospheres. A gas mixture in which carbon dioxide is the major constituent or is present in a predominating proportion is preferably treated at about room temperature. When, however, the gas mixture contains, apart from carbon dioxide substantial proportions of other gases such as carbon monoxide of nitrogen, the preferred treatment temperature lies between −40°C and −20°C.

An important advantage of the present invention is to be found in the fact that no extraneous solvent is required for carrying out the process. Apart from the recovery, possibly radioactive fraction, including the inert gas, no radioactive component arises and there is no danger that radiolytic decomposition products will result. Since no extraneous solvent is added, the apparatus for carrying out the process of the present invention may be of proportionately small size.

DESCRIPTION OF THE DRAWING

The above and other objects, features and advantages of the present invention will become more readily apparent from the following description, reference being made to the accompanying drawing in which.

SPECIFIC DESCRIPTION AND EXAMPLE

Figure 1:
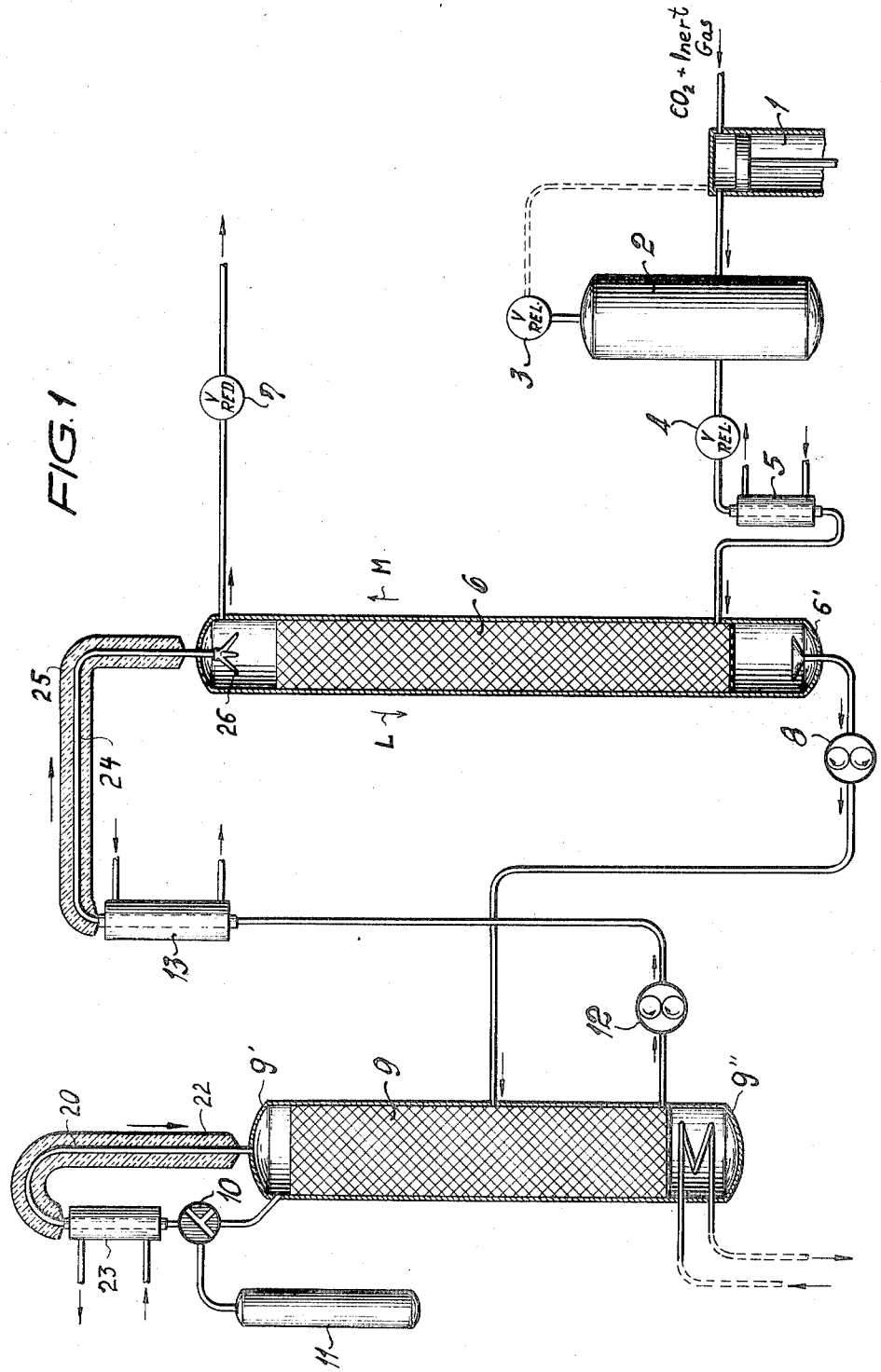
FIG. 1 is a flow diagram illustrating an apparatus for carrying out the present invention where the gas stream to be treated consists predominantly of carbon dioxide.

In FIG. 1, we have shown an apparatus which comprises a compressor 1 which is supplied with a gas mixture of carbon dioxide ($CO_2$) and inert gases such as krypton and xenon as derived from a plant from the recovery of radioactive components from nuclear fuels and fertile materials as obtained, for example, from a breeder type. In this case the fuel elements may be coated-fuel particles which are individually or collectively contained in a graphite sheath, matrix or like body or are provided with carbon coatings. The carbon is destroyed by combustion to produce the gas mixture which may include carbon dioxide produced by combination of the carbon with atmospheric oxygen during the combustion process, nitrogen entrained by the atmospheric air into the combustion system, inert gases such as krypton and xenon produced by fission processes and released by destruction of the carbon coatings and/or graphite casings, and other gases produced or present during the process. Downstream of the compressor 1 is a pressurized reservoir 2 for containing the gas, a pressure-sensor 3 being provided to control the compressor 1. The sensor 3 is a two-point pressure controller adapted to turn on the compressor when the pressure in tank 2 drops below a predetermined lower value and to turn off the compressor 1 as the pressure reaches a predetermined upper value. The regulator 3 thus establishes the operating pressure range of the system.

The pressure vessel 2 is connected by a flow controller 4 (e.g., a constant-rate valve) to a heat exchanger 5, the valve 4 maintaining the throughput substantially constant and independent from the back pressure of the line ahead of it. The heat exchanger 5 may be of the liquid-cool type in which the heat generated by compression is transferred to a cooling liquid, e.g., water when the system is to operate at a temperature close to atmospheric.

From the heat exchanger 5, the gas mixture is passed into a packed washing column 6 or a washing column provided with a plurality of baffles, the gas passing upwardly through this column as represented by the arrow M for a mixed-gas phase. The purified mixed gases, free from the inert gas component are released into the atmosphere through a throttle valve 7.

The compressed mixed gases expanding into the washing tower 6 in part condense under the effective expansion cooling, the condensate being recovered from the sump 6' of the washing column and circulated by a pump 8 as will be described in greater detail hereinafter. The pump 8 is preferably a gear pump.

The outlet of the pump 8 is connected to a rectification column 9 which may be provided with a packing of wire turns, the wire having a diameter of about 4mm. The upper part of the rectification column 9, i.e., the head 9', is formed with a closed loop 20 including a three-way valve 10 serving to control the reflux ratio. At the sump 9" of the rectification column, there is provided a boiler 21 heated by a fluid such as water or by electrical means. There fluxing loop can be formed with heat-dissipating veins 22 and with a liquid-cooled condenser 23. A receptacle 11 is provided to collect the fraction of inert gases which is removed.

At the lower part of the rectification column 9, liquid carbon dioxide is withdrawn by a gear pump 12, passed through a liquid-operated heat exchanger 13 and thence through a line 24 provided with vanes 25 for additional heat dissipation. The liquid carbon dioxide is then sprayed into the top of the wash tower 6 at 26.

Figure 2:
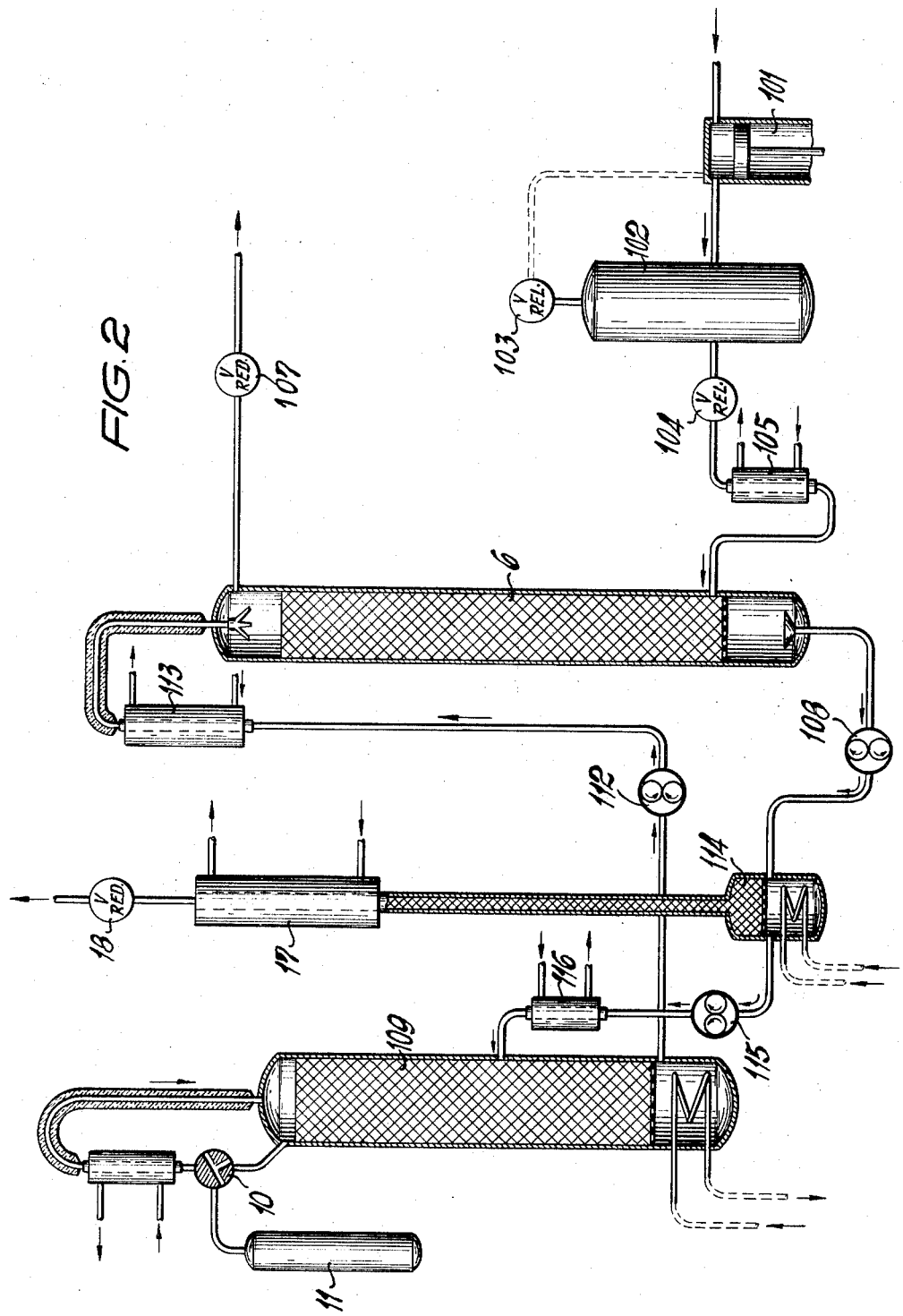
FIG. 2 is a flow diagram illustrating a system in which other gas components may be present in substantial quantity apart from carbon dioxide.

In FIG. 2, we have shown a generally similar system but designed especially for processing gas mixtures in which the carbon dioxide is present together with substantial quantities of other gases such as carbon monoxide, as mentioned earlier. As in the system of FIG. 1, this arrangement comprises the initial compressor 101 and its storage tank 102 with a two-point pressure regulator 103 connected to control the compressor 101. A constant-flow valve 104 leads to the heat exchanger 105 while the latter heat exchanger feeds the gas mixture to the column 106. An outlet via the throttle valve 107, constituting a means for maintaining pressure in a wash tower, opens to the atmosphere. Whereas the system of FIG. 1 provides a direct link between the rectification tower 9 and the sump of wash column 6, the system of FIG. 2 interposes a preliminary rectification tower 114 between the two.

The rectification column 114 receives the liquid phase from the tower 106 via the gear pump 108 and is, in turn, connected by a gear pump 115 to an intermediate portion of the column 109 is conducted via the gear pump 112 and the heat exchanger 113 to the head of the tower 106.

A reflux condenser 117 is provided at the head of the column 114 which can release nitrogen, for example, into the atmosphere via the pressure-reducing valve 118. The column 114 thus serves to separate nitrogen from the balance of the mixture.

In general, the system of FIG. 1 operates in the manner described, i.e., the gas mixture is compressed at 1 and cooled at 5 to eliminate the heat of compression, i.e., the heat produced by the compressor work. The expanding gases in the column 6 are in part cooled by removal of the latent heat of vaporization and in part cooled by the descending stream of liquid carbon dioxide (arrow L) which, having a high capacity for the inert gas, washes the rising gases substantially free from krypton and xenon. The liquid phase is introduced by the pump 8 into the rectification column 9 where the boiler 21 causes the liquid phase to evaporate so that rising vapors of carbon dioxide and the inert gas pass upwardly in counterflow to condensed carbon dioxide, the krypton being recovered at 11. The liquid phase, from which the inert gases are stripped, are returned to the head of the column 6. In the system of FIG. 2, the process is carried out as described except that nitrogen vapors are released from the intermediate column 114.

EXAMPLE I

In the examples below, all percentages are by volume.

A massive graphite from a nuclear reactor, containing krypton and xenon produced by fission reactions, is burnt to form a gas stream consisting predominantly of carbon dioxide together with 200 parts per million (ppm) krypton. Since combustion was effected with pure oxygen, substantially no nitrogen was present in the starting gas mixture.

The gas mixture was continuously compressed to a pressure of 75 atm. guage, thereby raising the temperature of the mixture to about 350°C. After compression, the gas was collected in a heat exchange (5,105) at an operating temperature of 25°C of the washing tower 6 or 106. The pressure was then about 63 atm. gauge. The height of the washing tower 6 or 106 was about 250 mm and its diameter was 45 mm, the tower being provided with wire mesh rings with transverse webs, the ring having a diameter of about 5 mm and forming a packing.

The rising gas stream was washed with a descending stream of liquid carbon dioxide until the gas mixture released at the top of the tower had a krypton content of at most 0.06 ppm. The liquid carbon dioxide was sprayed into the upper part of the column at a rate of about 4.5 liters per hour.

The liquid phase was delivered to the rectification column 9 or 109 which had an effective height of 600 mm and a diameter of 45 mm. The high pressure part of the column had a height of 400 mm and a diameter of 21 mm and the column was filled with wire turns of a diameter of 4 mm. The reflux ratio of output: refluxing liquid was about 1:4000. When equilibrium was attained at steady state, the rectification column yielded 0.05 liters per hour of a krypton-rich fraction containing about 10 percent krypton and about 4.5 liters per hour of a low-krypton fraction containing 0.02 ppm of krypton. Traces in proportion of xenon were also discussed.

EXAMPLE II

The installation of FIG. 2 was employed.

Atmosphere air was used to burn graphite as described in Example I and the resulting gas mixture consisted of about 20 percent carbon dioxide and about 80 percent nitrogen together with 100 ppm of krypton and traces of xenon. After compression and cooling as in Example I the gas mixture is fed to the washing column which is operated at a temperature of −30°C (about 243°K) and at a pressure of 70 atm. gauge. The gas flow rate was about 17 liters per hour. The carbon dioxide liquid extracted from this column contained, together with 60 ppm of krypton, approximately 1.9 percent nitrogen. The nitrogen was separated from the carbon dioxide in the rectification column 114 which was operated at a temperature of −30°C and 70 atm. The rectification column had a height of 800 mm and a diameter of 26 mm, being filled with wire turns of a diameter of 4 mm. The reflux ratio was about 3:1. The nitrogen released at the outlet 118 contained less than 0.01 ppm of krypton and carbon dioxide. The liquid carbon dioxide recovered from the sump of the column 14 was substantially free from nitrogen and was separated in rectification column 109 as described in Example I. From the latter rectification column, we received 0.05 liters per hour of a krypton-rich fraction containing most of the xenon and about 10 percent krypton while 4.5 liters per hour of a low-krypton fraction was obtained with a krypton concentration of 0.02 ppm krypton.

We claim:

1. A process for the removal of inert gases from a gas stream containing same together with carbon dioxide, comprising the steps of intimately contacting said gas stream with liquid carbon dioxide to solubilize inert gas in the liquid carbon dioxide and produce a liquid phase;

rectifying said liquid phase to separate a fraction rich in the inert gas therefrom and to produce a liquid carbon dioxide fraction; and recirculating the liquid carbon dioxide fraction into intimate content with further quantities of the gas stream.

2. The process defined in claim 1 wherein said gas stream is contacted with liquid carbon dioxide at a temperature substantially $-50°C$ and $30°C$.

3. The process defined in claim 2 wherein said gas stream consists predominantly of carbon dioxide and said temperature is approximately room temperature.

4. The process defined in claim 2 wherein said gas stream contains at least one other component in addition to carbon dioxide and wherein said gas stream is contacted with said liquid carbon dioxide at a temperature between $-40°C$ and $-20°C$.

5. The process defined in claim 4 further comprising the step of removing said other component from the liquid phase prior to the rectification thereof.

6. The process defined in claim 1 wherein said gas stream is intermittently contacted with said liquid carbon dioxide at a temperature between $-50°C$ and $30°C$ bypassing said gas stream upwardly through a packed column in counterflow to liquid carbon dioxide, discharging a gas phase consisting essentially of said mixture free from inert gas at an upper end of said column, and recovering said liquid phase at the lower end of said column.

7. The process defined in claim 6 further comprising the step of compressing said gas stream to a pressure greater than that of said column and cooling the compressed gas stream prior to introducing it into said column.

8. The process defined in claim 7 wherein said liquid phase is rectified by boiling the liquid phase in a packed rectification column, refluxing vapors at the upper end of said rectification column and drawing a liquid carbon dioxide fraction substantially free from inert gas from the bottom of said rectification column for washing of said gas stream, the fraction containing the inert gas being recovered from the tower of said rectification column.

9. The process defined in claim 8, further comprising passing said liquid phase into a further rectification column for removing nitrogen therefrom prior to introducing said liquid phase into the first mentioned rectification column.

10. The process defined in claim 8 wherein said gas stream is obtained by combustion of a product containing carbon and removed from a nuclear reactor, said inert gas being selected from the group which consists of krypton and xenon.

* * * * *